United States Patent [19]

Macfarlane et al.

[11] 4,219,769
[45] Aug. 26, 1980

[54] AUTOMATIC VOLTAGE REGULATOR

[75] Inventors: Alistair A. Macfarlane, East Kilbride; Ross C. McKemmie, Giffnock, both of Scotland

[73] Assignee: Contrology Techniques Limited, Glasgow, Scotland

[21] Appl. No.: 968,030

[22] Filed: Dec. 8, 1978

[51] Int. Cl.² .......................... H02P 9/14; H02P 9/30
[52] U.S. Cl. .................................. 322/28; 322/59; 322/73; 324/132
[58] Field of Search ...................... 322/25, 28, 59, 72, 322/73; 324/132; 328/144

[56]  References Cited
U.S. PATENT DOCUMENTS

| 3,564,391 | 2/1971 | Dinger | 322/25 |
| 3,605,006 | 9/1971 | Nagae et al. | 322/25 X |
| 3,755,685 | 8/1973 | Minks | 322/28 X |
| 3,858,108 | 12/1974 | Bray | 322/28 |
| 3,984,755 | 10/1976 | Lehnhoff et al. | 322/28 |

FOREIGN PATENT DOCUMENTS 1478297  6/1977  United Kingdom ..................... 322/73

Primary Examiner—Robert J. Hickey
Attorney, Agent, or Firm—Gerald J. Ferguson, Jr.; Joseph J. Baker

[57]  ABSTRACT

An automatic voltage regulator comprises means for monitoring the voltage of an alternator with a voltage crossover detector and a pulse generator so that a train of output control pulses are produced which are controlled in their mark to space ratio by the output of a circuit which senses the amplitude of the alternator output voltage.

4 Claims, 1 Drawing Figure

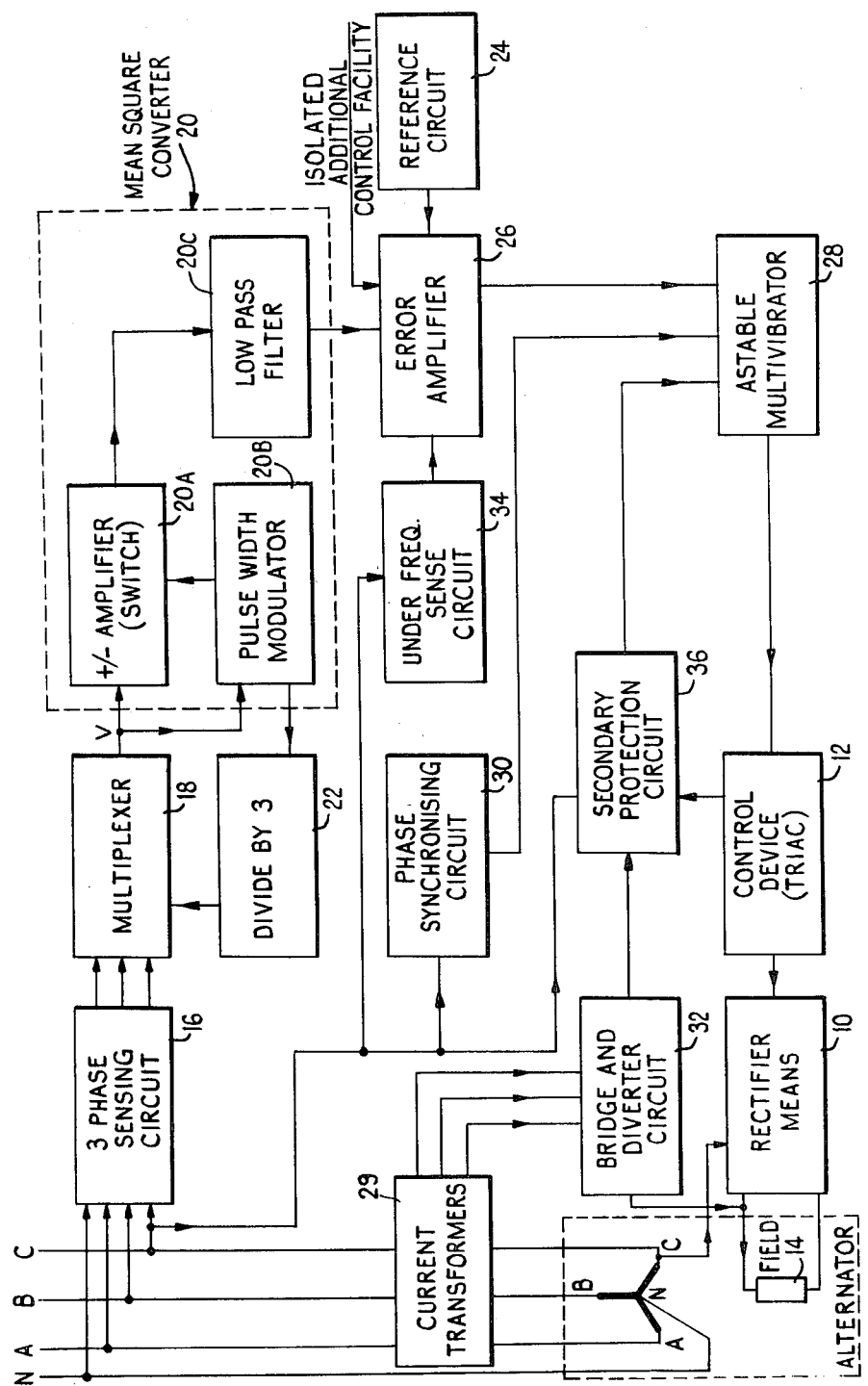

AUTOMATIC VOLTAGE REGULATOR

This invention relates to voltage regulators for automatically controlling the output voltage of an electric alternator.

In the specification of our British Pat. No. 1478297 we describe an automatic voltage regulator wherein, the field of the alternator is supplied with current derived from the output of the alternator, the current being controlled by full wave rectifier means. The rectification means may include a non-controlled full wave rectifier in series with a controllable device which may be a triac, or a pair of oppositely-poled paralled thyristors. The circuits described in the above specification, have general application to alternators of all sizes, but are particularly suitable for the direct supply of the field of smaller alternators.

The present invention provides a voltage regulator which is a modification of or improvement in the above described regulator.

According to the present invention there is provided a voltage regulator for an alternator having a field winding, said regulator comprising:

input terminals for connection to the alternator output, output terminals for connection to the alternator field winding, a field-winding excitation control circuit connected across said input terminals and including full wave rectification means arranged to supply a direct current to said output terminals, and current control means, drive means for said field-winding-excitation control circuit and connected to said current control means, and voltage monitoring means including a voltage cross-over detector coupled to said input terminals and a pulse generator connected to the output of said voltage cross-over detector and providing an output control signal for each half cycle of alternator output voltage, the train of output control signals so produced being coupled controllably to operate said drive means, said voltage monitoring means further including a sensing circuit for amplitude sensing of the alternator output voltage applied to said input terminals, and a comparator circuit for comparing the sensed voltage with a reference means, the comparator output being coupled to said pulse generator to control the mark-to-space ratio of said train of control signals, wherein said amplitude sensing circuit comprises amplitude sampling means, a pulse width modulator incorporating a free-running square wave generator the mark-to-space ratio of which is controllable in accordance with the output of said sampling means, a polarity-reversible amplifier coupled to the output of said sampling means and polarity controlled in accordance with the polarity of the sampled voltage, and a low-pass filter coupled to the output of said amplifier to provide a d.c. signal representative of the mean square value of the alternator voltage sensed by the sensing circuit.

Preferably, said voltage monitoring means includes an under-frequency sensitive circuit the output of which is coupled to said comparator circuit effectively to modify the reference voltage of said reference means.

Preferably, also, said field-winding-excitation control receives an auxiliary power supply derived from current transformers connected across the output of the alternator.

An embodiment of the present invention will now be described with reference to the accompanying block circuit diagram.

In the diagram, the rectifier means 10, and controllable device 12, are shown in block form, as supplying and controlling the alternator field 14 or exciter field. The means of controlling the controllable device (usually a triac or inverse-poled parallel thyristors) is as follows:

The output (normal three phase) voltage from the alternator is supplied to a three phase sensing circuit 16, where the sensed voltage is divided down by potential dividers to a level suitable for multiplexing.

In the multiplexer block 18, each phase voltage signal is sampled in turn at a frequency much greater than that of the alternator output voltage. The output from the multiplexer 18 is transferred to a mean square convertor block 20 which consists of three sub-elements: An amplifier or switch 20A whose gain can be switched between $+1$ and $-1$; a pulse width modulator 20B and a low pass filter 20C. The basis of the pulse width modulator 20B is formed by a free-running square wave generator which repetitively charges a capacitor up to a threshold and then regeneratively discharges the capacitor to a lower symmetrical threshold. Since the charge and discharge currents are equal in value, but opposite in polarity, and the threshold levels are symmetrical, the output is a square wave of equal mark-to-space ratio when the input voltage is zero. The square wave generator has a CMOS output stage which allows the output to swing within millivolts of either side of the regulated supply voltage. Accurate control of the feedback paths to the comparator is therefore achieved, and the need for matched clamping circuits at the output is eliminated. This square-wave signal is used in two ways. First, it is fed back to the multiplexer 18 through a "divide by three" frequency divider circuit 22 for normal three phase inputs. The output of the divide by three circuit 22 is used to sample the three phase voltages applied to the multiplexer 18 which sample, in turn, is supplied as a short single pulse of voltage to the pulse width modulator 20B, and also to the amplifier 20A. When the alternator voltage sample (V) is applied to the square-wave generator it off-sets the charge and discharge levels. The result is to modulate the square wave so as to change the mark-space ratio from the 50—50 condition. If the sample voltage is positive, the mark is altered to be less than 50%, if the sample voltage is negative, the mark is altered to be greater than 50%, the amount more or less being proportional to the sample voltage amplitude. This modulated pulse waveform is fed to the amplifier 20A to switch its gain to $-1$ while the pulse is positive (i.e. greater than 50%) and to $+1$ when it is negative (i.e. less than 50%). The resultant output from amplifier 20A is a pulse train of amplitude proportional to V and the time ratio also proportional to V. When filtered by filter 20C the average of the pulse train is obtained and this is the mean square value of voltage. As the function of the regulator is to maintain a constant RMS voltage from the alternator, it is not necessary to operate further on this signal to obtain the root. If the mean square is held constant, the root is also held constant.

The mean square signal is fed to an error amplifier 26 where it is compared with a very stable signal from a reference circuit 24 and the output of the error amplifier is used to control a monostable 28, which, in the absence of a signal from the error amplifier 26, is gated by a phase synchronising or zero cross-over circuit 30. In the phase synchronising circuit 30 a voltage 90° out of phase with a voltage feeding the regulator is derived. The voltage is fed to an amplifier whose gain is switched to +1 when the supply voltage (Vs) is positive and to −1 when the supply voltage is negative. This yields a waveform having peak-to-peak reversal coincident with the zero cross-over of the regulator supply voltage. This waveform establishes the start of each monostable pulse output, one for each half cycle of the alternator output and the output of the error amplifier 26 advances or retards the monostable pulse output relating to the zero cross-over detection in accordance with the polarity of the error signal. The pulses out of the multivibrator 28 in turn fire the triac 12, (or inverse paralleled thyristors) to control the field 14 of the alternator or exciter, through the rectifier 10, to maintain constant RMS alternator voltage, under changes of load, power factor etc., in the alternator output.

To maintain stability of the closed loop consisting of the AVR and its alternator, phase lead networks are incorporated with the error amplifier 26 to compensate for the lags associated with the main and, if necessary, the exciter field 14.

There is a requirement to maintain a field current during alternator short-circuit or similar condition caused by system faults or transient over-load conditions, such as motor starting. The supply to the regulator and hence to the field 14 disappears under these conditions when the supply is derived from the alternator voltage and a separate source is required. In the present regulator, a supply to the field 14 is drawn from the alternator output current, via current transformers 29 through a rectifier and divertor circuit 32, and fed to the field as shown in the block diagram.

One cause of field failure is running the alternator at speeds below that for which it is designed. Due to the reduced speed, the voltage of the alternator falls, and the regulator responds by forcing up the supply to the field 14. If sustained, this can lead to overheating, and burn-out of the field system. This is protected against in the present circuit by an under-frequency-sense circuit 34. The action of this circuit is delayed to allow normal transients to occur without tripping. The circuit 34 has a set frequency, above which it is inoperative. Below this frequency, which is indicated by a light-emitting diode, the alternator output voltage is reduced in a controlled manner as the frequency is reduced. Over loading of the field system is prevented.

The alternator output voltage is clipped and the zero cross-over detected. The derived pulse signal is fed through a resistor to a capacitor in order to produce a triangular waveform. With fixed values of resistance and capacitance the charge and discharge waveforms are fixed. If the alternator output frequency falls the charge and discharge times increase and the peak triangular wave voltage increases in proportion to frequency reduction. This voltage is compared with a reference d.c. level and the mark-to-space ratio of a square wave signal modulated by the resultant error signal. The output square wave signal, which is present only when the reference d.c. is less than the derived signal voltage, is integrated to provide a d.c. signal which is fed to the error amplifier 26 effectively to reduce the reference in the event of under frequency operation.

The field 14 and the regulator may also be damaged by overload from other causes. For example, if the alternator has to supply its nominal voltage at the end of a long transmission line, the voltage generated at the alternator terminals may be set very much higher than the design figure. Magnetic saturation could then cause an overfield state, with the regulator and exciter and alternator fields working on continuous overload.

Protection against this, and other system faults, such as over-voltage from any cause or overload in current, is obtained from an additional circuit, shown in the block diagram as the secondary protection circuit 36. the parameters which are monitored are field current, alternator output voltage and alternator output current. (The output current signal being from a resistor in series with the short circuit maintenance unit). In this circuit 36 amplifiers and comparators are used to monitor each of the parameters. The comparators operate a warning LED and after a short time delay energise an opto-isolator having its transistor connected to the capacitor of the monostable 28. If a sustained fault occurs the field excitation is reduced to a set level which provides protection.

The power supply to the regulator—not shown in the block diagram, uses a reactive (capacitive) dropper to feed a full-wave rectifier capacitively loaded to give a d.c. voltage. This eliminates a transformer, or power consuming dropper resistor.

The supply to the analogue circuits is controlled by a temperature compensated zener regulator and a shunt regulator. This gives the very stable d.c. voltage required for optimum circuit performance, particularly for the pulse width modulator circuits. The shunt regulator is capable of shunting transients to a safe level.

When the alternator is being run up to rated speed, or run down, the armature voltage will at some stage be too low adequately to power the electronics; either the main control loop, or the under-frequency circuit. To cater for this two additional circuits are provided;

(1) Until the d.c. supply to the electronics is reasonably established, the base emitter junction of a transistor is held forward biassed and this transistor being on prevents the RMS converter 20 from inhibiting the firing of the control device 12. This is however, overridden by (2).

(2) While the integral of the supply voltage is excessive (i.e. frequency×voltage is high), the base emitter junction of a transistor is reversed biassed and this prevents the astable multivibrator 28 from firing the control device 12. This then gives a linear increase in voltage with speed under start-up conditions so that over voltage transients are prevented.

It will now be appreciated that the regulator described herein uses similar rectifier means for the control of the alternator field to the aforementioned regulator of British Pat. No. 1,478,297 but has features of control, which, while generally applicable to all alternators, are particularly suited to the control of larger alternators, either by controlling the alternator field, or the field of an exciter (for example—a brushless exciter) which in turn, controls the excitation of the main alternator field, and hence its output voltage. In particular, the regulator described in this embodiment, has means for controlling the alternator voltage to maintain a constant root-mean-square value (RMS value), has a circuit which allows low frequency unloading of the alternator to take place, at a specific frequency, and at a specific rate, has means for maintaining the alternator field under short-circuit conditions, and means for protection of the alternator field and automatic regulator under conditions of excessive loading.

What is claimed is:

1. A voltage regulator for an alternator having a field winding, said regulator comprising:

input terminals for connection to the alternator output, output terminals for connection to the alternator field winding, a field-winding excitation control circuit connected across said input terminals and including full wave rectification means arranged to supply a direct current to said output terminals, and current control means, drive means for said field-winding-excitation control circuit and connected to said current control means, and voltage monitoring means including a voltage cross-over detector coupled to said input terminals and a pulse generator connected to the output of said voltage cross-over detector and providing an output control signal for each half cycle of alternator output voltage, the train of output control signals so produced being coupled controllably to operate said drive means said voltage monitoring means further including a sensing circuit for amplitude sensing of the alternator output voltage applied to said input terminals, and a comparator circuit for comparing the sensed voltage with a reference means, the comparator output being coupled to said pulse generator to control the mark-to-space ratio of said train of control signals wherein said amplitude sensing circuit comprises amplitude sampling means, a pulse width modulator incorporating a free-running square wave generator the mark-to-space ratio of which is controllable in accordance with the output of said sampling means, a polarity-reversible amplifier coupled to the output of said sampling means and polarity controlled in accordance with the polarity of the sampled voltage, and a low-pass filter coupled to the output of said amplifier to provide a d.c. signal representative of the mean square value of the alternator voltage sensed by the sensing circuit.

2. A voltage regulator as claimed in claim 1, wherein said comparator circuit includes a phase lead network to compensate for lags associated with the alternator field winding.

3. A voltage regulator as claimed in claim 1,
including an under-frequency-sensitivity circuit the output of which is coupled to said comparator circuit effectively to modify the reference voltage of said reference means.

4. A voltage regulator as claimed in claim 1, including an auxiliary power supply derived from current transformers connected across the output of the alternator.

* * * * *